United States Patent [19]

Röll

[11] 4,411,152

[45] Oct. 25, 1983

[54] METHOD AND APPARATUS FOR TESTING PIPES

[75] Inventor: Werner Röll, Hamm, Fed. Rep. of Germany

[73] Assignee: Estel Hoesch Werke Aktiengesellschaft, Dortmund, Fed. Rep. of Germany

[21] Appl. No.: 287,630

[22] Filed: Jul. 28, 1981

[30] Foreign Application Priority Data

Aug. 1, 1980 [DE] Fed. Rep. of Germany ....... 3029180

[51] Int. Cl.³ ............................................. G01M 3/28
[52] U.S. Cl. ......................................... 73/46; 73/49.5
[58] Field of Search ........................ 73/49.5, 49.6, 46; 138/90

[56] References Cited

U.S. PATENT DOCUMENTS

2,241,526 5/1941 Rosenkranz ...................... 73/46 X
2,663,183 12/1953 Huhn ..................................... 73/46

Primary Examiner—Steven L. Stephan
Assistant Examiner—Joseph W. Roskos
Attorney, Agent, or Firm—Max Fogiel

[57] ABSTRACT

A method and an apparatus for testing the tightness of a threaded connection between an oilfield pipe and a tapped connector. An annular space along the threaded connection is sealed with a test head, and only the threaded connection is thus subjected to internal hydraulic pressure via this connection.

18 Claims, 3 Drawing Figures

METHOD AND APPARATUS FOR TESTING PIPES

BACKGROUND OF THE INVENTION

The present invention relates in general to the testing of pipes, and more particularly to method and apparatus for testing tubings and casings used in oilfield applications.

According to API Spec. 5A, Section 5.1, it is required that tubings and casings for oilfield applications and having a "power-tightened" threaded connecting sleeve of a diameter up to 13⅜ inches (=339.7 mm), are required to undergo a hydraulic internal pressure test. For this purpose the tubings and casings, inclusive of the sleeve, are usually transported to a water-pressure testing machine, in which the entire assembly is filled with a water/emulsion mixture and pressurized to the required pressure level which must be maintained for a period of 5 seconds.

A problem with this approach is that it is quite elaborate and cost-intensive, since a complete water-circulation system must be installed. Another problem is that the brief five second time is not adequate to determine whether the threaded connection itself is actually tight, due to the fact that water dripping off the machine from the previously emptied pipe tends to obscure any leakage at the threaded joint. Moreover, if leakage does occur at the threaded joint, the quantity will be so small as to not cause any perceptible drop in the test pressure. Finally, the water-pressure testing machine itself is very expensive, especially because it must be connectable to both ends of the pipe and since both connecting heads of the machine must be capable of withstanding the quite enormous axial thrust of the pressurizing medium.

Also known in the prior art are methods and installations which make it possible to test a completed installation-ready connection of two oilfield pipes with external threaded connecting sleeve, either from the exterior (the Gather Hauck method) or from the interior at the site (in the drilling tower). However, both of these approaches can be used only in installation-ready applications. It is not possible to adapt either of these methods for use in factory (as opposed to on-site) testing, because after the completed test one of the two pipes would have to be unscrewed from the connecting sleeve which, as is known, usually results in a destruction of (or at least damage to) the threads involved.

SUMMARY OF THE INVENTION

It is, accordingly, an object of the invention to overcome the prior art disadvantages.

A more particular object of the invention is to provide an improved method and arrangement for testing threaded oilfield-pipe connections for tightness at the manufacturer's site of operation.

Another object is to provide such an improved method and arrangement which makes it possible to identify leakage at the threaded joints with simple equipment and while having to maintain the pipes pressurized only for a brief period of time.

A comcomitant object is to require as little pressure medium as possible and to avoid any damage to the threads involved.

The invention is based upon the realization that each pipe per se is normally thoroughly pressure tested for tightness while its ends are still smooth, i.e. before they are formed with threads. All that needs to be finally tested, therefore, are the final steps involved; i.e. threading of the pipe end, manufacture of the tapped connecting sleeve, mating of the connecting sleeve with the threaded pipe end, and checking the threaded joint for tightness. Accordingly, the present invention purposes to subject only the threaded pipe end and the tapped connecting sleeve to an internal pressure test to determine tightness.

According to a further concept of the invention the volume of pressure medium required for this—already substantially reduced by the inventive concept—can be reduced still further by utilizing as the pressure chamber for the pressure test only an annular space at the pipe end/connecting sleeve wall.

Having resort to the present invention, the entire quantity of pressure medium needed to carry out the pressure test on a 13⅜ inch (339.7 mm) oilfield pipe, amounts to about two liters. This contrasts with the conventional water-pressure test of a 14 m long oilfield pipe of the same 13⅜ inch diameter, where 1,270 liters of water/emulsion (i.e. pressure medium) are required just to fill the pipe.

Aside from the tremendous savings in pressure medium which are realized with the invention, the small volume of pressure medium needed to fill the annular space according to the invention can be introduced and removed so rapidly that the times required for this purpose now constitute merely a negligible part of the test-procedure time.

Further, it is advantageous to utilize the test pressure in order to attain axial locking (i.e. arresting of the position) of the testing head. The locking pressure increases as the testing pressure does. In this manner the cylinder needed for advancing of the testing head can be made of relatively small dimensions, which reduces its weight and cost. Incidentally, this combination (i.e. where the test pressure equals the locking pressure) can be used with particular advantage if, according to another concept of the invention, oil is used as the pressure medium, because this eliminates corrosion danger for the components of the installation as well as for the threads at the pipe end and in the connecting sleeve.

As explained above, the quantity of pressure medium needed is very small and this brings with it certain advantages which have already been mentioned. Another advantage resulting directly from the small quantity of pressure medium is the fact that even a slight leakage at a defective threaded joint will result in a noticeable drop of the indicated test pressure, so that the difference between nominal test pressure (drag-indicator needle) and actual pressure is readily visible.

The arrangement according to the present invention requires only a test head which surrounds the threaded joint and thus seals the earlier-mentioned annular space. This eliminates the need (and cost) for a second test head (counter-pressure head) and the expensive water-/emulsion supply installation with its requisite low-pressure and high-pressure supply systems.

It is advantageous to seal the annular space against the outer circumferential surface of the connecting sleeve, because a seal adjacent the end of the sleeve would be structurally much more difficult to achieve. Moreover, this outer seal of the sleeve, ahead of the pipe end provided with the thread, prevents due to the pressure equilibrium inside and outside at the sleeve end that an unintentional expansion of the sleeve might take place (with the resulting danger that the screw connection could be spread partly open and the leakage indication thereby falsified).

It goes without saying that if oil is used as the pressure medium, the seals used must not be subject to attack by the oil.

The type of seal used permits an absolute sealing of the annular space by the fact that increasing spreading of the seal legs occurs with increasing test pressure, with simultaneous yielding of the seal legs when the test head is pushed onto the pipe end respectively onto the connecting sleeve.

Still another advantage of the rather small annular pressure space is that the reaction forces resulting from the test pressure and the effective "piston surface" and acting upon the axial locking and/or the test-head advancing cylinder, remains small. This allows the entire aggregate to be constructed less massively than would otherwise be required and saves the high costs involved in such a more massive construction.

By construction of the sleeve the oilfield pipe is held in position without requiring tension due to frictional pressure on the pipe surface; this eliminates the otherwise sometimes unavoidable damage to the pipe surface or deformation of the pipe from round to oval cross section.

It is advantageous if individual defective parts of the test head—or indeed the entire test head itself—can be replaced. Replacement of the complete test head would be advantageous in e.g. the case of dimension changes, i.e. if pipes of different dimensions need to be tested.

It is also an advantage to mount the test head and the clamping device, so as to be height-adjustable in the event a new (and different) pipe diameter is to be tested. This is simpler than the heretofore customary height adjustment of the pipe support grids, bars or similar elements.

Circular guides are preferable for the axial shifting of the test head, because they are inexpensive to produce and require little maintenance. Despite this light-weight inexpensive construction, the necessary rigidity is assured. Due to the manner of axial clamping these circular guides—given the light-weight overall construction—are able to fulfill additional functions, and in addition it is possible to use commercially available sleeves.

The simplest manner of indicating leakage losses through the threaded connection is via the manometer which must in any case be present to indicate the test pressure. If a pressure indicator is used having a drag-pointer, then it is possible to determine at a single glance both the initially selected test pressure as well as any possible pressure loss due to leakage.

The invention will hereafter be described with reference to an exemplary embodiment as illustrated in the appended drawings. However, this should be understood to be for purposes of explanation only and it is not to be considered limiting in any sense.

DESCRIPTION OF PREFERRED EMBODIMENTS

Figure 1:
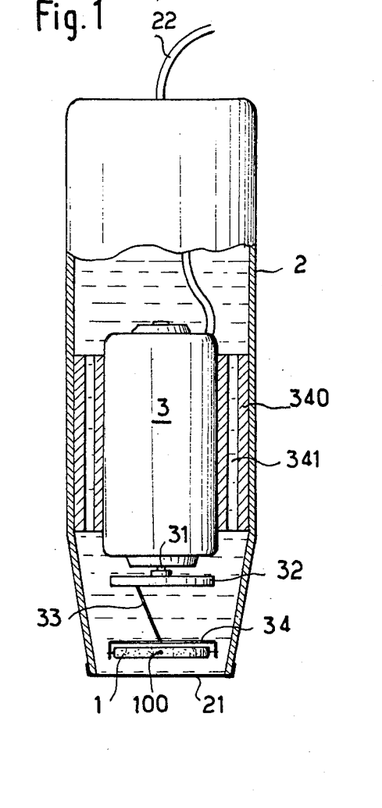
FIG. 1 is a fragmentary sectional side view illustrating an embodiment of the invention.
Figure 2:
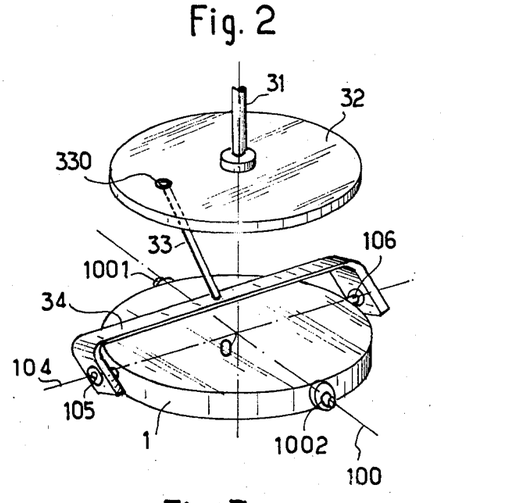
FIG. 2 is a fragmentary section on line II—II of FIG. 1, showing the test head and a pipe clamping arrangement.
Figure 3:
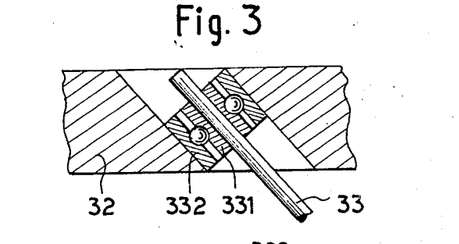
FIG. 3 is a fragmentary section on line III—III of FIG. 1, but with oil lines omitted for clarity.
Figures 4, 5:
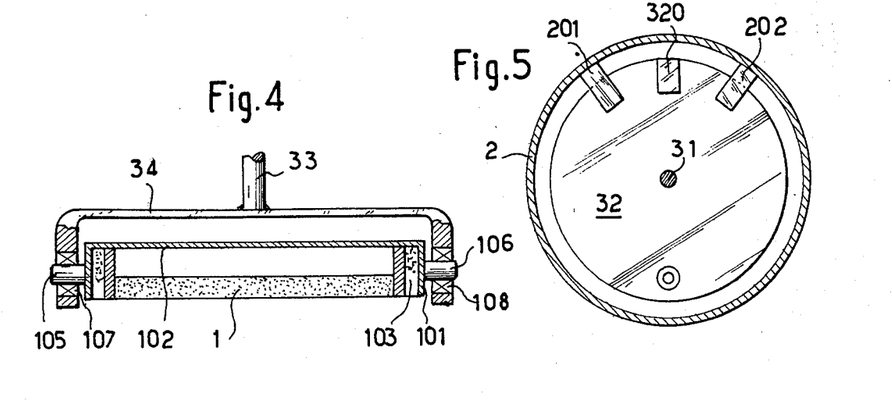
Figure 6:
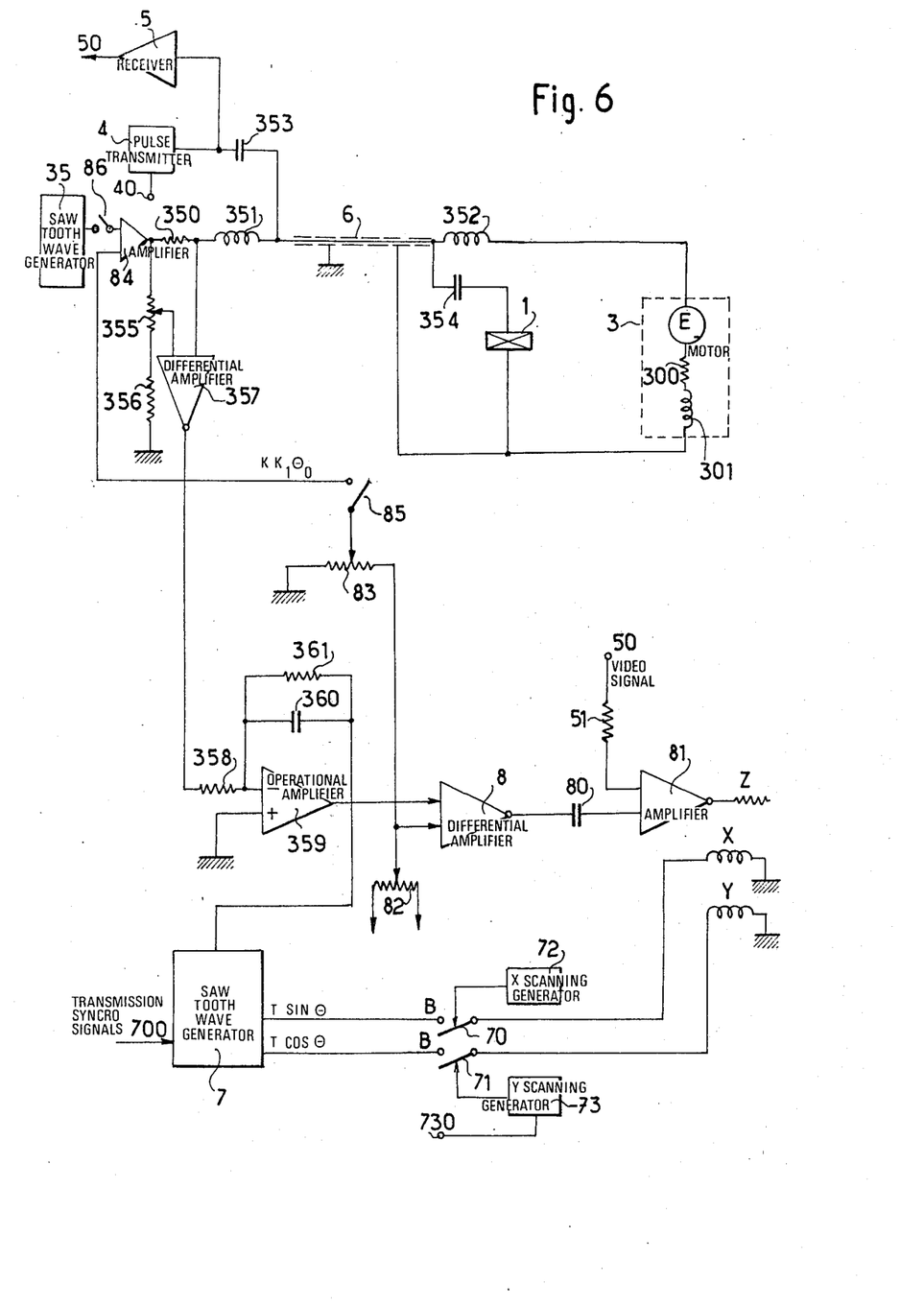
Figure 7:
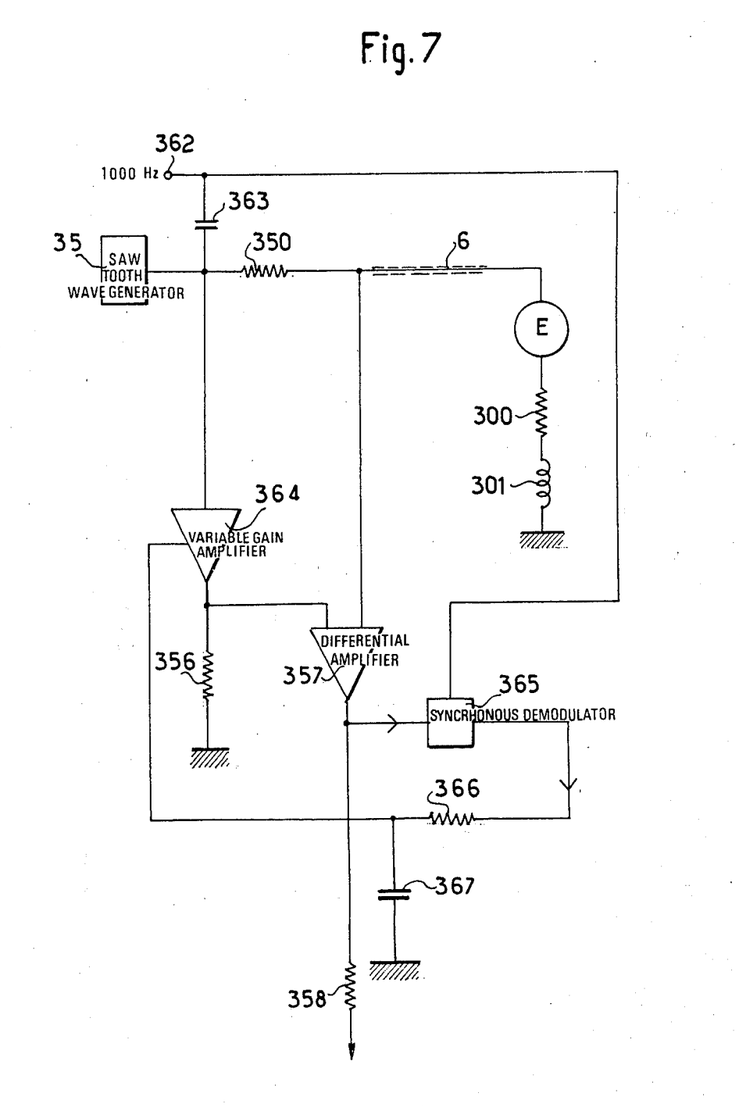
Figure 8:
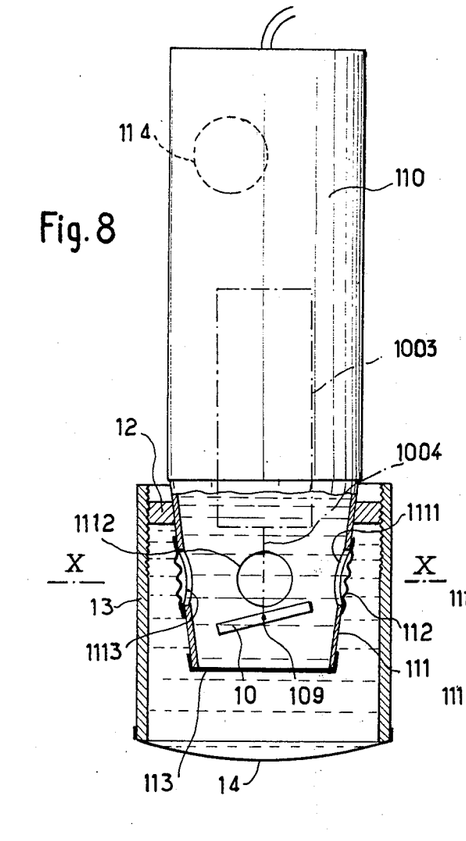

In the embodiment illustrated in FIGS. 1–3 an oilfield pipe 1 to be tested is provided at its end portion 2 with threads. A tapped connecting sleeve (FIG. 1) has been threaded onto the end portion 2. An axial roller conveyor (not shown) is used to transport the pipe 1 and sleeve 3 into the hydraulic pipe handling device, until the sleeve 3 has passed in its entire length through the region of the illustrated clamping jaws 30. Thereupon, clamping cylinders 29 are operated to close the clamping jaws 30 (which are held by threads 31) so that they engage and centrically hold the pipe 1, but do not fixedly clamp the same. The entire hydraulic pipe handling device is mounted on a not-illustrated carriage which, once the pipe is engaged, is axially retracted until the jaws 30 abut behind the sleeve 3. Now, cylinders 28 are operated to move the test head 4 over the pipe end portion 2 carrying the sleeve 3.

Head 4 is centrally mounted via screws 21 on flange 43 in the housing 20. The latter, in turn, is axially shiftably mounted via its flanges 42 and 43 (and guide rings 24) on three guides 27 which are distributed over 120° on the circumference. Three clamping rings 25 arranged on the guides 27 behind the guide rings 24, serve to arrest the head 4 where desired. The guides 27 are mounted on a guide plate 39 and on clamping cylinders 29. The latter are mounted on a support 32 which is height-adjustable together with the guide plate 39 (via lifting spindles 39 and handwheel 36) relative to the frame 37; the purpose of this measure is to be able to adapt the arrangement to work with pipes of different diameters. Once a height has been set, the support 32 is arrested via lock 34 on the plate 33.

Depending upon the diameter of the oilfield pipes 1 to be tested, differently sized testing heads 4 must be used; each such head can, however, be used for substantially the entire range of pipe wall-thicknesses that are permissible for use with the particular pipe diameter. To exchange one head 4 for another it is merely necessary to release the screws 21 and the oil connection 16.

Each test head 4 (shown in more detail in FIG. 2) is composed of an inner "mandrel" 5 and an outer ring 23 secured thereon via screws 22. To save weight the inner mandrel 5 is hollow; it also has several different stepped outer diameters, to assure that the annular space 13 between the sleeve 3 (and pipe end portion 2) and the surface of the mandrel 5 is as small as possible. This annular space 13 is delimited within the interior of the pipe by a U-shaped sealing ring 6 which is pushed onto the mandrel 5 and is of rubber or synthetic plastic material (for example "Vulcolan"/TM). A nut 14 and support rings 8 and 10 fix the sealing ring 6 against displacement in axial direction.

The leg 40 of the sealing ring is made flat at the outer side, to have the largest possible contact surface relative to the pipe wall so that, when pressure builds up in the annular space 13, the leg 40 will lie flat against the pipe wall and cannot fold over.

At the outer side of the sleeve 3 the annular space 13 is similarly delimited by a sealing ring 7 (clamped in the outer ring 23 between support rings 9, 11 and nut 15) having legs 40 which are constructed as described in the preceding paragraph.

An abutment ring 12 is arranged at the line of separation between the outer ring 23 and mandrel 5, directly in front of the sleeve 3; its purpose is to serve as an abutment for the stroke of the cylinder 28 and, in addition, to reduce the hydraulic pressure acting upon the above-mentioned line of separation. Ring 12 has several grooves to assure that the test (pressure) medium can freely flow in the space 13 from the outer side of the sleeve 3 to the inner side thereof.

The arrangement of the guide rings 24 (two sets of three rings each) on the guides 27 is shown in FIG. 3. Each guide ring is composed of a housing 46 and a slide sleeve 45 which is guided in the housing 46. Each two guide rings 24 on a guide 27 are surrounded by a sleeve 44 which protects them against contamination. For purposes of stabilization they are welded to the flanges 42, 43 of the guide housing 20.

Clamping rings 25 are flanged behind the housing 20. A pressure space 48 exists between the clamping-ring housing 47, the oil connections 49 and the sleeve 26. The latter, incidentally, consist of an elastomeric material (rubber or synthetic plastic) which has embedded steel lamellae as reinforcements. All of the pressure spaces 48 are connected with the annular space 13 of test head 4 via oil line 17 and oil connector 16 (FIG. 1). The oil pressure can be read off the manometer 18 as an absolute value as well as a differential value between two pressure conditions.

The oil circuit can be vented via a venting valve 19 and hose 41. Oil issuing from the hose 41 is collected in the oil receptacle 38. The entire hydraulic system is supplied by a not-illustrated central hydraulic aggregate.

Once the test head 4 has been moved in position over the sleeve 3, the valve 19 is opened and a high-pressure pump of the central hydraulic aggregate is switched on. The valve 19 is closed once the oil issues from the hose 41 free of air bubbles; the pressure of the test medium is then increased to the preselected test pressure (e.g. 500 bar) and the high-pressure pump switched off. After the prescribed holding time (e.g. five seconds) at constant pressure the valve 19 is opened, so that the oil can flow off into the receptacle 38 via hose 41. Thereafter the cylinders 28 are operated to retract the head 4, the cylinders 29 open the jaws 30 and the tested pipe 1 (with sleeve 3) can then be axially withdrawn from the device via the not-illustrated axial roller conveyor.

The invention has been described and illustrated with reference to a specific embodiment. However, modifications ans variations will offer themselves to those skilled in the art and, therefore, should and are intended to be encompassed within the scope of the appended claims.

I claim:

1. A method for testing tightness of threaded connections of oilfield pipes, comprising the steps of: threading a tapped connecting sleeve onto a threaded pipe end portion to establish a threaded connection therebetween; subjecting the region of the threaded pipe end portion connected to said sleeve to internal hydraulic pressure; and applying pressure additionally from the outside to the sleeve end; and limiting the volume of hydraulic pressure medium by an annular ring-shaped space along said threaded connection, pressure applied from the outside compensating said internal hydraulic pressure for preventing widening of the sleeve and accompanying leakage between pipe and sleeve threads.

2. A method as defined in claim 1, wherein the step of subjecting comprises exposing only said threaded connection to said internal hydraulic pressure.

3. A method as defined in claim 2, wherein the step of subjecting comprises applying hydraulic pressure medium only to an annular space along said threaded connection.

4. A method as defined in claim 1, wherein the internal hydraulic pressure is equal to the clamping pressure used for the axial clamping of a test head used in the step of subjecting.

5. A method as defined in claim 1, and further comprising the step of indicating any pressure leakage as a pressure drop on a manometer.

6. A method as defined in claim 1, wherein the step of subjecting is carried on using oil as the hydraulic pressure medium.

7. Apparatus for testing the tightness of threads, particularly of oilfield pipes, comprising: a frame; a clamping arrangement on said frame for clamping a pipe to be tested; an axially shiftable test head which can be placed over a threaded pipe end portion and defines and seals an annular ring-shaped space extending along said pipe end portion and a tapped connecting sleeve threaded onto said pipe end portion; and means for supplying said test head with hydraulic fluid for applying internal hydraulic pressure, pressure being applied additionally from the outside of the sleeve end; the volume of hydraulic fluid being limited by said annular ring-shaped space along said threaded connection, pressure applied from the outside compensating said internal hydraulic pressure for preventing widening of the sleeve and accompanying leakage between pipe and sleeve threads.

8. Apparatus as defined in claim 7, wherein said test head contains an outer ring and an inner mandrel, and sealing means for sealing said annular space between said outer ring and a surface of said sleeve and between said mandrel and a surface of said pipe.

9. Apparatus as defined in claim 8, said sealing means comprising U-shaped, pressure-expansible seals of flexible material resistant to oil.

10. Apparatus as defined in claim 8, wherein the test head in toto, said outer ring, said mandrel and said sealing means are each individually replaceable.

11. Apparatus as defined in claim 7, wherein a difference between an inner and outer radius of said annular space is at most equal to 1.5 times the maximum wall-thickness of the pipe to be tested.

12. Apparatus as defined in claim 7; further comprising means for axially clamping said sleeve between clamping jaws of a clamping device and an abutment ring of said test head.

13. Apparatus as defined in claim 7; and further comprising height-adjusting means for said test head.

14. Apparatus as defined in claim 13, said height-adjusting means comprising a plurality of synchronously adjustable spindle elements.

15. Apparatus as defined in claim 7; further comprising three equi-angularly arranged axial guides, a guide housing having a pair of flanges, and guide rings, said test head being mounted on said guides via said flanges and guide rings.

16. Apparatus as defined in claim 15; and further comprising three clamping rings surrounding said guides for axial clamping of said test head.

17. Apparatus as defined in claim 16, said clamping rings having pressure spaces; and further comprising means hydraulically connecting said pressure spaces with said annular space.

18. Apparatus as defined in claim 7, further comprising a hydraulic circuit; and a manometer interposed in said hydraulic circuit and having indicators for test pressure and pressure losses.

* * * * *

UNITED STATES PATENT AND TRADEMARK OFFICE
CERTIFICATE OF CORRECTION

PATENT NO. : 4,411,152

DATED : October 25, 1983

INVENTOR(S) : Werner Roll

It is certified that error appears in the above-identified patent and that said Letters Patent is hereby corrected as shown below:

The title page should be deleted to appear as per attached title page.

The sheets of Drawings consisting of Figures 1-10 should be deleted to appear as per attached sheets.

Signed and Sealed this

Tenth Day of September 1985

[SEAL]

Attest:

DONALD J. QUIGG

Attesting Officer    Acting Commissioner of Patents and Trademarks - Designate

United States Patent [19]

Röll

[11] 4,411,152
[45] Oct. 25, 1983

[54] METHOD AND APPARATUS FOR TESTING PIPES

[75] Inventor: Werner Röll, Hamm, Fed. Rep. of Germany

[73] Assignee: Estel Hoesch Werke Aktiengesellschaft, Dortmund, Fed. Rep. of Germany

[21] Appl. No.: 287,630

[22] Filed: Jul. 28, 1981

[30] Foreign Application Priority Data

Aug. 1, 1980 [DE] Fed. Rep. of Germany ...... 3029180

[51] Int. Cl.³ .................................... G01M 3/28
[52] U.S. Cl. .......................... 73/46; 73/49.5
[58] Field of Search ............ 73/49.5, 49.6, 46; 138/90

[56] References Cited

U.S. PATENT DOCUMENTS

2,241,526  5/1941  Rosenkranz ............ 73/46 X
2,663,183  12/1953  Huhn ...................... 73/46

Primary Examiner—Steven L. Stephan
Assistant Examiner—Joseph W. Roskos
Attorney, Agent, or Firm—Max Fogiel

[57] ABSTRACT

A method and an apparatus for testing the tightness of a threaded connection between an oilfield pipe and a tapped connector. An annular space along the threaded connection is sealed with a test head, and only the threaded connection is thus subjected to internal hydraulic pressure via this connection.

18 Claims, 3 Drawing Figures

Patent No. 4,411,152

FIG. 1

Patent No. 4,411,152

FIG. 2

FIG. 3